United States Patent Office 3,632,552
Patented Jan. 4, 1972

3,632,552
THERMALLY STABLE POLY(BETA-LACTONE) POLYMERS
Jacoba P. E. Smid, Servaas van der Ven, Hendrik van der Vliet, and Eduard M. A. A. J. van Acker, Amsterdam, Netherlands, assignors to Shell Oil Company, New York, N.Y.
No Drawing. Filed Dec. 20, 1968, Ser. No. 785,767
Int. Cl. C01g 51/58
U.S. Cl. 260—45.7 S
8 Claims

ABSTRACT OF THE DISCLOSURE

Antigassing agents (desactivators) which prevent "unzipping" of poly(beta-lactones) comprise (1) alpha- or beta-aryl- or allyl-substituted alkyl halides, (2) complexes of a boron halide and a phosphine, (3) arenediazonium salts of complex fluoro acids, (4) tropylium salts, (5) ammonia salts and (6) dihydrocarbyl sulfides.

BACKGROUND OF THE INVENTION

This invention relates to a process for the preparation of stable compositions comprising one or more polymers of beta-lactones.

Processes are known for the polymerization of lactones, particularly the beta-lactones, to crystalline linear polyesters having a high molecular weight. See, for example, the following patents: U.S. 3,021,309, U.S. 3,268,-486, British 766,347, French 1,231,163 and Belgian 649,828. These polyesters are valuable thermoplastic polymers from which, with the aid of known shaping techniques, useful shaped objects can be made, such as foils, sheets, plates, profiles, tubes, fibers, threads, and solid or hollow pieces.

In order to shape the polymers into the desired form, it is necessary to melt the polymer, after which the desired products can be obtained by any shaping technique known in the art such as extrusion or molding. At temperatures above the melting point, which, in general, are between 200° and 300° C., the polymers of beta-lactones show a tendency to decompose into gaseous products. For example, heating of a homopolymer of pivalolactone to a temperature above its melting point (about 240° C.) gives rise to the formation of isobutylene and carbon dioxide. The formation of gaseous products in the polymer mass is unfavorable for the properties of the shaped products described above, because the inclusion of gas bubbles in these products after solidification not only renders the products nonhomogeneous and unpleasant to look at but also has a detrimental effect on their mechanical properties.

Since monomer molecules and gaseous low-molecular-weight products which can be depicted as decomposition products of monomer molecules are formed during the decomposition of polymer at high temperatures it is assumed that the decomposition reaction starts with an "unzipping" mechanism beginning at the end of a polymer chain, during which unzipping monomer molecules and other low-molecular-weight products (which may be formed as such or by decomposition of a monomer molecule formed) are set free.

It has now been found that the formation of low-molecular-weight decomposition products, in particular, gaseous decomposition products, can be greatly inhibited by adding one or more compounds of a group of compounds (so-called desactivators) which prevent or inhibit unzipping of the polymer by protecting its end groups.

SUMMARY OF THE INVENTION

The present invention relates to a process for the preparation of stable compositions comprising one or more polymers or copolymers of beta-lactones and at least one antigassing agent.

These antigassing agents which are also known as desactivators, are believed to prevent "unzipping" of the poly(beta-lactone)polymers and are mixed or blended with the poly(beta-lactone) after the complete polymerization thereof.

The antigassing agents are selected from the classes of (1) alpha- or beta-aryl- or allyl-substituted alkyl halides (beta-phenyl ethyl chloride); (2) complexes of a boron halide and a phosphine (boron trifluoride-triphenylphosphine); (3) arenediazonium salts of complex fluoro acids (parachlorobenzenediazonium hexafluorophosphate); (4) tropylium salts (tropylium tetrafluoroborate); (5) ammonium salts (ammonium chloride); and (6) dihydrocarbyl sulphides (di-hexadecyl monosulphide).

The dihydrocarbyl sulfides are especially preferred as antigassing agents.

DESCRIPTION OF THE PREFERRED EMBODIMENT

The invention provides a process for the preparation of compositions comprising one or more polymers or copolymers of beta-lactones which comprises mixing the said polymer with one or more desactivators of the group consisting of dihydrocarbyl sulfides, α- or β-aryl- or allyl-substituted alkyl halides, complexes of boron halides and phosphines, arene-diazonium salts of complex fluoroacids, tropylium salts and ammonium salts.

The compositions referred to in the present specification may be defined as compositions wherein disintegration or decomposition of the polymer molecules, and particularly decomposition to gaseous products at elevated temperatures, is prevented or reduced.

Polymers of beta-lactones coming within the scope of this invention are linear polyesters comprising recurrent structural units of the formula

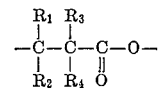

wherein $R_1$, $R_2$, $R_3$ and $R_4$ denote a hydrogen atom or a hydrocarbon radical, such as alkyl, alkaryl, aryl or arylalkyl, which hydrocarbon radicals may contain hereto atoms, for example halogen (e.g. chlorine); $R_1$, $R_2$, $R_3$, and $R_4$ may be similar or dissimilar.

These polyesters can very suitably be prepared by polymerization or copolymerization of one or more β-lactones of the formula

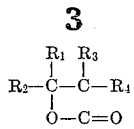

wherein $R_1$, $R_2$, $R_3$ and $R_4$ have the meaning given above; in the preparation of copolymers several compounds which are capable of participating in the polymerization may be used as comonomers, such as, for instance, epoxy compounds.

β-Lactones wherein $R_1=R_2=H$ are very suitable. In this class of compounds preference is given to β-lactones wherein $R_3$ and $R_4$ denote alkyl radicals, especially with not more than four carbon atoms, such as methyl, ethyl, propyl, isopropyl, butyl, for example, α-methyl-α-ethyl-β-propiolactone, α-methyl-α-butyl-β-propiolactone, α,α-di-propyl-β-propiolactone, α,α-dibutyl-β-propiolactone. α,α-dimethyl-β-propiolactone (also called pivalolactone) is especially preferred as monomer for the preparation of polymers of β-lactones.

Very suitable are polymers which can be obtained by polymerization of β-lactones only (no comonomers which do not contain a β-lactone structure being present during polymerization), and in this class of compounds homopolymers, in particular homopolymers of α,α-dimethyl-β-propiolactone are preferred.

The polyester may readily be prepared by the polymerization of pivalolactone (alpha,alpha-dimethyl-beta-propiolactone) as disclosed by Klootwijk in U.S. 3,268,486. The thermoplastic resin may consist of a polymer obtained from pivalolactone as the sole monomer or may consist of certain copolymers or polymer blends. Thus, copolymeric components may be present in the polyester in amounts of up to 25 mol. percent. It is preferred that the copolymeric units be grouped in blocks alternating with blocks of pivalolactone polymer. As copolymer components, lactones are particularly suited, especially beta-propiolactones. For example, the copolymers may be derived from copolymerization of pivalolactone with up to 25 mol. percent of alpha, alpha-diethyl-beta-propiolactone or alpha-ethyl-alpha-methyl-beta-propiolactone. Also suitable in the invention are blends of a pivalolactone polymer or copolymer as defined hereinbefore with up to about 25 mol. percent of alpha,alpha-diethyl-beta-propiolactone amides like nylon-6 or nylon-12; polyesters like polyethyleneterephthalate; polyvinyl butyral; polyepoxides (+curing agent); polyolefins like polypropylene and chlorinated polyether resins like "Penton."

It is understood that the thermoplastic resins herein referred to as "polypivalolactone" also comprise blends of polymers and/or copolymers of pivalolactone with other thermoplastic resins compatible therewith so long as these blends consist of at least 75% by weight of structural units of the formula:

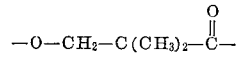

Particularly preferred are the thermoplastic resins containing at least 90% and more particularly more than 95% by weight of the structural units of the formula:

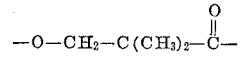

The dihydrocarbyl sulfides to be used as desactivators may contain one, two or more sulphur atoms with dihydrocarbyl sulfides containing one or two sulphur atoms are preferred.

The two hydrocarbyl radicals bound to the sulphur atom or atoms in the dihydrocarbyl sulfides may be similar or dissimilar, they may be branched or unbranched, and they may contain or consist of alicyclic hydrocarbon rings.

Hydrocarbyl radicals consisting of straight-chain saturated hydrocarbon radicals, in particular, those which contain between 7 and 20 carbon atoms are very suitable.

Dihydrocarbyl sulfides having two identical hydrocarbyl radicals are very suitable. Suitable examples, among others, include didecylmono- and disulfide, didodecyl mono- and disulphide, dioctadecyl mono- and disulfide. Dihexadecyl monosulfide is particularly preferred.

The α- or β-aryl- or allyl-substituted alkyl halides which according to the present invention can be used as desactivators very conveniently consist of β-aryl-substituted alkyl halides and are preferably chlorides. The aryl group which is a substituent to the alkyl halide may be mono- or polycyclic, and may contain one or more hydrocarbon- or hetero-atom containing substituents attached to the ring such as a methyl group, an ethyl group, a chlorine atom, a nitro group or a methoxy group. Examples of these compounds are β-naphthyl ethyl chloride, the β-tolyl ethyl chlorides, the β-(chlorophenyl) ethyl chlorides, the β-(nitrophenyl) ethyl chlorides. Beta-phenyl ethyl chloride is especially preferred.

Of the complexes of boron halides and phosphines suitable as desactivators according to the invention, complexes of boron trihalides are especially suitable, and in this class of compounds, complexes of boron trifluoride are preferred. Aromatic phosphines can very conveniently be used, such as triphenylphosphine and the tritolylphosphines. The complex of boron trifluoride and triphenylphosphine is particularly preferred.

Arenediazonium salts of complex fluoroacids which can advantageously be used as desactivators according to the invention are salts of aryl- or substituted aryl-, and particularly phenyl- or substituted phenyldiazonium ions such as p-chlorophenyldiazonium ion, p-nitrophenyldiazonium ion, phenyldiazonium ion and ions of complex fluoroacids. The hexafluorophosphate ion is very suitable as the ion of a complex fluoroacid. Para-chlorophenyldiazonium hexafluorophosphate is especially preferred.

The tropylium salts suitable as desactivators according to the present invention, include the salts of inorganic acids and particularly the compounds having anions containing boron and halogen. Tropylium tetrafluoroborate is especially preferred.

Ammonium salts which are very suitable to be used as desactivators according to the invention are the inorganic ammonium salts. In this class of compounds, the ammonium halides are of special importance; ammonium chloride being preferred.

Mixtures of two or more desactivators can be used.

The quantity in which the said desactivators are used is, as a rule, between 0.0001 and 5 parts by weight per 100 parts of polymer, preferably between 0.001 and 1 part per 100 parts of polymer.

Stabilizers inhibiting reactions other than those which give rise to gas formation by means of unzipping (such as thermal splitting reactions of ester or other bonds in the polymer chain) and antioxidants may be present in the polymer-containing compositions together with the said desactivators. They can be incorporated into the composition before, after or together with the desactivators. Suitable compounds for this purpose include the various amines, as, for example, phenyl-β-naphthylamine; phenols, particularly the sterically hindered phenols, i.e., phenols which contain secondary or tertiary hydrocarbon radicals in ortho-positions as substituents, such as, for example, 2,6-diisopropylphenol, 2,6-di-tert-butyl - 4 - methylphenol, 2,2-bis-(3',5'-di-tert-butyl-4'-hydroxyphenyl)propane and 1,3,5-tris-(3',5'-di-tert-butyl - 4' - hydroxybenzyl) - 2,4,4-trimethylbenzene; thiuram disulphides, such as tetraalkyl thiuram disulphide; dilauryl-β-dithiodipropionate; substituted thiourea compounds; substituted urea compounds such as the mono-, di- and trialkyl and aryl urea compounds (e.g. 1,6-hexylenediurea); dithiocarbamates of selenium or tellurium, for example the diethyl dithiocarbamates thereof; arylguanidines, for example the N,N'-diarylguanidines such as diphenylguanidine and di-ortho-tolylguanidine or organic salts of arylguanidines, e.g. salts thereof with phthalic acid, carbamic acid, phenylacetic acid, 2,4-dinitrophenol; monoarylhydrazines, such as phenylhydrazine, 4-tolylhydrazine, 3-nitrophenylhydrazine and 2,4-dinitrophenylhydrazine; organic phosphites, for example, tri(nonylphenyl) phosphite, phosphites of poly-alcohols such as glycols, glycerol, butanediol, trimethylolpropane, pentaerythritol; organic polythiophosphates, and salts thereof, particularly the zinc salts, such as o,o-diethylzinc dithiophosphate; nitrosoaromatic compounds, for example, 1 - nitroso - 2 - naphthol, 2,4 - dinitroso - 1,3-resorcinol, N,4-dinitroso-N-methylaniline; benzotriazoles containing a phenolic hydroxyl group, for example, 2-(2'-hydroxyphenyl) benzotriazole; benzophenones containing a phenolic hydroxyl group, for example 2,2'-dihydroxy-4'-methoxybenzophenone, 2-hydroxy-4 - n - octoxybenzophenone.

The amount of each of these stabilizers and antioxidants employed is, as a rule, between 0.01 and 1% by weight of the polymer. Of course, mixtures of several of these stabilizers and antioxidants can be used.

The desactivators according to the invention, as well as the antioxidants and stabilizers, may be mixed with the polymers according to known techniques.

The compositions may be prepared by mixing the components in the form of dry powders. Since very little desactivator is usually required, it may be advisable in order to obtain a homogeneous distribution, first to mix the required quantity of stabilizer with a small proportion of the polymer, and subsequently to mix the resultant mixture with the remaining polymer. If desired, the desactivators may be added to the polymer in the form of a solution. Suitable solvents for this purpose include aromatic hydrocarbons, alcohols, ethers and ketones. The choice of the solvent will depend on the solubility therein of the compound to be added. The solvent will, as a rule, be removed by evaporation after the polymer has been impregnated with the solution and for that reason volatile solvents are preferred. The homogeneity of the composition may be further enhanced by a mechanical treatment, such as milling at temperatures near the softening point.

Owing to the inhibition of gas formation in the compositions obtained according to the process of the invention, these compositions are especially suitable for processing at elevated temperatures, for shaping, for example, by extrusion to threads, fibers, strips, films, and by molding, such as injection molding to all kinds of articles of use, and for coating.

The invention is illustrated by the following examples. The reactants, their proportions and other specific ingredients of the formulations are presented as being typical and various modifications can be made in view of the foregoing disclosure without departing from the spirit or scope of the disclosure or of the claims. Unless otherwise specified, parts and percentages disclosed are by weight.

Example

In all experiments, a lactone polymer was used, which had been prepared as follows: 2.5 millimole tributylphosphine, 0.25 millimole pivalolactone and 20 ml. aviation alkylate were boiled under reflux for one hour. A so-called prepolymer was precipitated, filtered off, washed with acetone, and dispersed in 280 ml. aviation alkylate. The temperature of this mixture was adjusted at 60° C. and 100 g. (1 mole) pivalolactone was gradually added over two hours. After another hour, the polymer formed (95 g.) was filtered off. The intrinsic viscosity in benzyl alcohol at 150° C. of the polymer obtained was 2.2 dl./g.

The desactivators were mixed with the polymer by impregnating the polymer powder with a solution of the desactivator in benzene or methanol (10-millimole desactivator per liter) containing the desired amount of desactivator. The solvent was removed in vacuum at a temperature of at most 100° C.

The polymer/desactivator mixtures were tested by subjecting them to a temperature of 306° C. for 20 minutes in an atmosphere of air or hydrogen, and determining the amounts of carbon dioxide and isobutylene produced.

The results are tabulated in the table.

TABLE

| Desactivator | Parts of desactivator per 100 parts of polymer | Carbon dioxide plus isobutylene formed (percent w. on polymer) |
|---|---|---|
| In air: | | |
| None | | 2.5 |
| Dihexadecyl monosulphide | 0.25 | 0.12 |
| Under hydrogen: | | |
| None | | 0.51 |
| Dihexadecyl monosulphide | 0.1 | 0.08 |
| Do | 0.25 | 0.04 |
| β-Phenyl ethyl chloride | 0.02 | 0.72 |
| Tropylium tetrafluoro borate | 0.02 | 0.74 |
| p-Chlorobenzenediazonium hexafluorophosphate | 0.04 | 0.52 |
| Complex of boron trifluoride and triphenylphosphine | 0.02 | 0.28 |
| Ammonium chloride | 0.007 | 0.26 |
| Do | 0.03 | 0. |
| Do | 0.04 | 0.00 |

We claim as our invention:

1. A stabilized composition comprising (1) a poly(beta-lactone) and (2) from 0.0001 to 5 parts per one hundred parts by weight of said poly(beta-lactone) of a dihydrocarbyl sulfide selected from the group consisting of monosulfides and disulfides wherein said hydrocarbyl radicals are each saturated, straight-chain hydrocarbon radicals containing between 7 and 20 carbon atoms.

2. A composition as in claim 1 wherein the poly(beta-lactone) is obtained by the polymerization of at least one beta-lactone of the formula

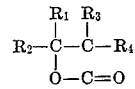

wherein $R_1$, $R_2$, $R_3$, and $R_4$ each are selected from the group consisting of hydrogen, hydrocarbon radicals and hetero-substituted hydrocarbon radicals.

3. A composition as in claim 2, wherein $R_1=R_2=H$.

4. A composition as in claim 1 wherein the poly(beta-lactone) is a poly(alpha, alpha - dialkyl - beta - propiolactone) wherein the alkyl groups contain from 1 to 4 carbon atoms.

5. A composition as in claim 4 wherein the poly(beta-lactone) is polypivalolactone.

6. A composition as in claim 1 wherein the poly(beta-lactone) comprises at least 95% by weight of structural units of the formula

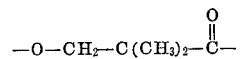

7. A composition as in claim 1 wherein the dihydrocarbyl sulfide is dihexadecyl monosulfide.

8. A composition as in claim 1 wherein the dihydrocarbyl sulfide is employed in amounts from about 0.001 to 1 part per 100 parts by weight of the poly(beta-lactone).

References Cited

UNITED STATES PATENTS 3,297,629  1/1967  Kauder _____ 260—45.7
3,309,337  3/1967  Hurlock et al. _____ 260—45.7
3,510,449  5/1970  Nagato et al. _____ 260—45.7

DONALD E. CZAJA, Primary Examiner

V. P. HOKE, Assistant Examiner

U.S. Cl. X.R.

260—45.7 P, 45.7 PS, 45.75 R, 45.8 N, 45.85 R, 45.9, 45.95

UNITED STATES PATENT OFFICE
CERTIFICATE OF CORRECTION

Patent No. 3,632,552         Dated  January 4, 1972

Inventor(s) JACOBA P.E. SMID, SERVAAS VAN DER VEN, HENDRIK VAN DER VLIET, EDUARD M.A.A.J. VAN ACKER It is certified that error appears in the above-identified patent and that said Letters Patent are hereby corrected as shown below:

Column 3, line 1, the structural formula should appear as follows:

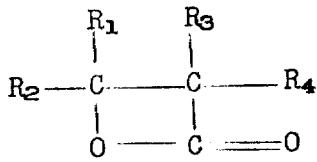

Claim 2, the structural formula should appear as follows:

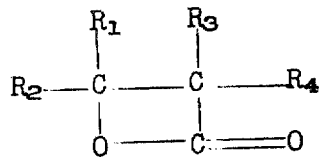

Signed and sealed this 3rd day of October 1972.

(SEAL)
Attest:

EDWARD M. FLETCHER, JR.
Attesting Officer

ROBERT GOTTSCHALK
Commissioner of Patents